Patented Nov. 21, 1922.

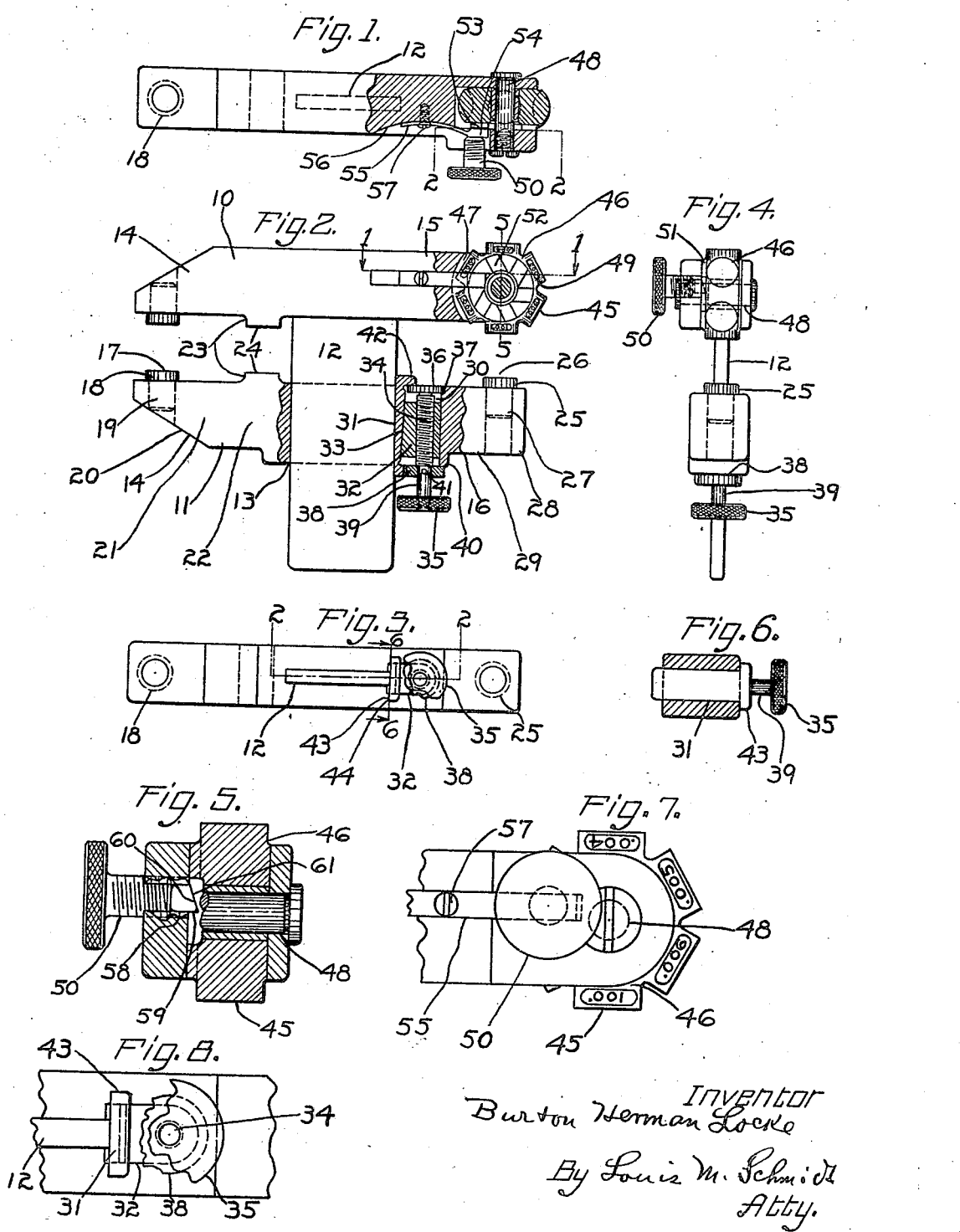

1,436,181

UNITED STATES PATENT OFFICE.

BURTON HERMAN LOCKE, OF NEW BRITAIN, CONNECTICUT.

SNAP GAUGE.

Application filed October 7, 1920. Serial No. 415,325.

*To all whom it may concern:*

Be it known that I, BURTON HERMAN LOCKE, a citizen of the United States, residing at New Britain, in the county of Hartford and State of Connecticut, have invented certain new and useful Improvements in Snap Gauges, of which the following is a specification.

My invention relates to improvements in snap gauges of the form that is used for the inspection of work for accuracy within prescribed limits and involving the use of two different gauges, one for the maximum permitted dimension and the other for the minimum, the two gauges being designated respectively as the "Go" and the "No go," and which differ to correspond to the said limits or the tolerance, and the object of my improvement is to produce in a unitary gauge structure two pairs of arms with suitable contact blocks that are supported by a common support, the blocks on one pair of arms being adapted to serve to determine the one limit and those on the other pair of arms the other limit; having common means for adjusting and locking the said arms on the support; and, having the contact block on one of the arms in the form of a rotative device or star-wheel for providing a choice or selection of the active contacting surface from a plurality of such surfaces that are formed to provide different distances or spread relatively to the mating contact block.

In the accompanying drawing:—

Figure 1 is a plan view of my improved snap gauge, with a part in section on the line 1—1 of Fig. 2.

Figure 2 is a side elevation of the same, with one part thereof in section on the line 2—2 of Fig. 1 and another part thereof in section on the line 2—2 of Fig. 3.

Figure 3 is a view of the movable arm structure, as viewed from the under side with the stem in the socket.

Figure 4 is an end elevation of the structure shown in Fig. 2.

Figure 5 is a sectional view on an enlarged scale on the line 5—5 of Fig. 2.

Figure 6 is a sectional view on the same scale as Fig. 1 on the line 6—6 of Fig. 3.

Figure 7 is a side elevation of the star-wheel and adjacent parts.

Figure 8 is a fragmentary view of certain parts shown in Fig. 3.

My improved snap gauge comprises a pair of arm structures which may be designated with reference to Fig. 2 as an upper arm structure 10 and a lower arm structure 11 that are provided with means of adjustment for separation or spread in the form of a stem and socket, as shown, the stem 12, of rectangular form of cross-section being secured to the upper arm structure 10, at about the middle thereof, and being extended through a recess or socket 13 in the lower arm structure 11.

The arm structures 10 and 11 extend laterally on each side of the stem 12 so as to provide on each side a pair of arms proper, comprising at the left the upper and lower arms 14 that are similar, and at the right the upper arm 15 and the lower arm 16.

The arms 14 at the left in the structure shown as used for the "go" test, are used as fixed devices for a given adjustment of the spread of the arm structures; and have the active contacting or bearing faces 17 provided on the outer end faces of suitable headed plugs 18 that are entered into receiving sockets 19 adjacent the outer end portions 21 of the said arms 14. The outer corners of the arms 14 are cut away so as to provide converging, inclined faces 20 for the said outer end portions 21, which serve to indicate that the said left arms 14 are adapted for use for the "go" test.

The contact blocks 18 are positioned appreciably outwardly from the stem 12 on the arms 14 and on the opposed faces of the portions 22 of the said arms 14 that are intermediate the said blocks 18 and the stem 12 are raised platform structures 23 whose opposed faces 24 are finished for the use of a standard measuring block in setting the arm structures 10 and 11.

The outer contact faces 17 on the blocks 18 and the inner contact faces 24 on the platforms 23 are finished so as to provide in use the same spread, so that the inner faces 24 can be used for setting the arms structures 10 and 11 and the outer faces 17 can be used on the work for testing and measuring.

The lower right arm 16 has adjacent the outer end a contact block 25 that is similar to the left contact block 18, having a contact face 26 on the inner end, and being entered into a socket 27 in the arm 16. The outer corner 28 of the said lower arm 16 is substantially in the form of a right angle, as distinguished from the inclined outer face structure 20 of the left arms 14 described.

The right lower block 25 is positioned in the outer end portion 29 of the arm 16, as mentioned, and intermediate the said block 25 and the socket 13 for the stem 12 the arm 16 is provided with locking means for locking the arm 16 to the said stem 12, the said locking means being housed generally in a housing chamber or recess 30 that is provided in the arm 16 and communicates with the socket 13 for the stem 12.

The said locking means comprise the bearing block 31 that is opposed to and in bearing engagement with the edge of the stem 12, the slide block 32 that is opposed to the bearing block 31 the said blocks 31 and 32 cooperating to effect a clamping pressure on the stem through the medium of the contacting inclined faces 33, and a clamping screw 34 that is provided with means for shifting the slide block 32 for effecting the locking of the parts.

The slide block 32 has threaded engagement with the screw 34 and is moved in parallelism with the stem 12, and, as shown, when moved upwardly serves to effect a clamping of the parts, and when moved in the reverse direction releases the parts, there being clearance space at each end of the slide block to permit of the necessary movement.

The clamping screw 34 has a head 35 at the lower end, and extends upwardly through the slide block 32, and has on each side thereof a collar that is in operative engagement with a suitable bearing face or surface on the arm 16 for fixing the position of the screw longitudinally, so that as the screw is turned the slide block is moved.

The upper collar 36 is fixed to the end of the screw 34 and is operatively housed in a generally annular recess 37.

The lower collar 38 is mounted on the stem or shank portion 39 of the screw 34 and is in bearing engagement with a downwardly extended boss or projection 40 on the arm 16, being held in place by a pin 41.

The bearing block 31 is provided with positioning means in the form of suitable overhanging flanges, comprising at the upper end the single laterally directed flange 42, shown in Fig. 2, that is of the same width as the chamber or recess 30 so as to be adapted to be inserted therethrough in assembling the parts, and that overhangs the upper collar 36, and at the lower end the two side flanges 43, shown in Fig. 3, that engage with the opposed portion of the bottom face 44 of the arm 16. As shown, the flanges 43 engage with surfaces that are extensions of the bottom face of the boss 40.

Thus the lower flanges 43 resist upward movement of the bearing block 31 by reason of engagement with the arm 16 directly and the upper flange 42 resists downward movement thereof by reason of engagement with the said arm 16 indirectly, through the medium of the upper collar 36 on the locking or clamping screw 34.

In the case of the arms 15 and 16 on the right or "no go" side of the device, the distance between the opposed active faces is less than the distance between the faces 17 on the "go" side by an amount that is determined by the prescribed limits or tolerance, as is well understood.

I have in the structure shown provided a plurality of available contact faces 45 distributed around the periphery of the contact member 46 in the form of a star-wheel that is operatively housed in a slot 47 in the upper arm 15 and rotatively mounted on the shaft 48, and positioned in opposition to the lower contact face 26, so as to be adapted to be set individually for cooperating with the said lower contact face 26.

As shown, there are six of the said available, individual contact faces 45. These differ by a definite amount one from the other so as to permit of reducing the gap between the opposed active faces and the one that provides the widest gap projects inwardly by a definite amount relatively to the upper contact face 17, the dimensions for these differences being in all cases relatively small for close work, and the radial arms 49 that support the faces 45 are provided, in use, with suitable markings. Such markings for the structure shown, would be in dimensions that are measured by suitable fractions of the inch, each difference corresponding to one-thousandth of an inch, the values being as follows:—.001, .002, .003, .004, .005, and .006.

Positioning means for the star-wheel structure 46 are provided in the form of what is essentially a ratchet and pawl structure that permits of setting the wheel to the desired position and having a tightening screw 50 for tightening the parts after the desired setting has been obtained.

As shown, the front face portion of the wheel 46 is provided with a swelling or enlargement 51 in the form of an annular platform that is cut transversely on each side of the middle to provide suitable recesses 52 for receiving and cooperating with the tooth 53 on the pawl head 54, the tightening screw 50 being opposed to the outer face of the said pawl head 54.

As shown, the pawl head 54 is supported by a spring arm 55 in the form of a leaf spring that extends inwardly along the arm 15, being housed in a recess 56 therein and held in place by the screw 57.

The tooth 53 has on one side a flat face 58 that serves as the positive locking face in cooperation with the opposed, similar flat side 59 of the recess 52 and an inclined end face 60 that fits against the correspondingly inclined bottom wall 61 of the said recess 52, and, as shown, the flat, positive locking faces 58 and 59 are located along an axial plane, so that the maximum resistance to turning the wheel under conditions of use will be obtained.

The positive locking feature mentioned is arranged so as to be effective for the particular condition of use that corresponds to applying the device to the work, as distinguished from removing the same. Thus, as viewed in Fig. 2, the movement of the tool or device for application to the work would correspond to a movement of the tool towards the right, the work being entered between the faces 26 and 45, and the engagement of the face 45 with the work will tend to turn the wheel 46 in the clockwise direction. For most effectively resisting this movement of the wheel 46 the flat faces 58 and 59 are positioned in the horizontal plane, on the left side of the axis of the shaft 48.

Referring to the feature of the contact faces on the "go" arms 14, comprising the active contact faces 17 and the inner, setting contact faces 24, it is understood that either pair of these can be used for setting the arm structures by the use of a standard distance block. Also, by using such a standard distance block of sufficient length to bridge the gap laterally between the faces 17 and 24 the condition as to the parallelism of the said arm structures can be tested.

I claim as my invention:—

1. A limit snap gauge comprising a fixed member, a movable member opposed thereto and having a slot, a stem supported from said fixed member and slidably engaged with said slot, a pair of contact faces that are opposed one to the other being provided on said members at one side of said stem, one of said members being provided with a contact face that is opposed to the other of said members and located at the other side of said stem, and a star-wheel, said star-wheel being rotatively mounted on said other member, in opposed relation to said last mentioned contact face, and having a plurality of contact faces for selective cooperation with said last mentioned contact face.

2. A snap gauge as described in claim 1, said members being provided with other contact faces for use as positioning faces in cooperation with a standard measuring block.

3. In a snap gauge, a fixed contact member having a supporting stem, a movable contact member having an opening for said stem and having an extension of said opening adjacent said stem, and locking means for locking said movable contact member to said stem housed in and generally filling said extension, said locking means comprising a pair of cooperating blocks having opposed inclined faces and means for shifting the relative position of said blocks, whereby pressure can be applied to the stem and the blocks to lock the stem in said opening.

BURTON HERMAN LOCKE.